United States Patent
Maeda et al.

(10) Patent No.: US 9,670,958 B2
(45) Date of Patent: Jun. 6, 2017

(54) ROLLING BEARING

(71) Applicant: JTEKT CORPORATION, Osaka-shi, Osaka (JP)

(72) Inventors: Masaki Maeda, Nisshin (JP); Yuu Yasuda, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/081,127

(22) Filed: Mar. 25, 2016

(65) Prior Publication Data
US 2016/0290398 A1  Oct. 6, 2016

(30) Foreign Application Priority Data

Apr. 1, 2015 (JP) ................... 2015-075202

(51) Int. Cl.
*F16C 33/41* (2006.01)
*F16C 33/66* (2006.01)
*F16C 19/06* (2006.01)

(52) U.S. Cl.
CPC ........ *F16C 33/416* (2013.01); *F16C 33/6681* (2013.01); *F16C 19/06* (2013.01); *F16C 2361/63* (2013.01); *F16C 2361/65* (2013.01)

(58) Field of Classification Search
CPC ....... F16C 33/41–33/418; F16C 33/49–33/498
See application file for complete search history.

(56) References Cited

U.S. PATENT DOCUMENTS

| 4,106,827 A * | 8/1978 | Ducret .................. F16C 19/187 384/482 |
| 5,941,704 A * | 8/1999 | Arai ........................ A61C 1/181 384/523 |
| 8,480,305 B2 * | 7/2013 | Maeda .................. F16C 33/416 384/523 |
| 8,985,860 B2 * | 3/2015 | Honjo ................. F16C 33/4682 384/526 |
| 2011/0069920 A1 | 3/2011 | Aida |
| 2011/0299805 A1 * | 12/2011 | Damato ............... F16C 19/163 384/531 |

FOREIGN PATENT DOCUMENTS

| JP | 2006-342820 A | 12/2006 |
| JP | 2009-281585 A | 12/2009 |

* cited by examiner

*Primary Examiner* — Thomas R. Hannon
(74) *Attorney, Agent, or Firm* — Oliff PLC

(57) ABSTRACT

A rolling bearing includes an outer ring, an inner ring, a plurality of balls disposed between the outer ring and the inner ring and allowed to roll, and a snap cage that is made of resin and holds the balls. The snap cage includes an annular main portion and a plurality of cage bars. The cage bars each protrude from a right side surface of the main portion. Pockets are formed between the cage bars to house the respective balls. An inner circumferential surface and an outer circumferential surface of each of the cage bars in a radial direction have respective tilted surfaces that form a tapered shape in an axial direction. This allows lubricant oil to flow well in the rolling bearing in both directions.

3 Claims, 4 Drawing Sheets

PRIOR ART

ROLLING BEARING

INCORPORATION BY REFERENCE

The disclosure of Japanese Patent Application No. 2015-075202 filed on Apr. 1, 2015 including the specification, drawings and abstract, is incorporated herein by reference in its entirety.

BACKGROUND OF THE INVENTION

1. Field of the Invention

The present invention relates to a rolling bearing. In particular, the present invention relates to a rolling bearing which is a deep groove ball bearing having low torque and used for transmission support shafts or continuously-variable-transmission (CVT) shafts of hybrid vehicles (HVs).

2. Description of Related Art

Hybrid vehicles (HVs) have good fuel efficiency, and have become widespread in recent years. Rolling bearings used for transmission support shafts of the HVs are deep groove ball bearings which are suitably used with low torque. Rolling bearings used for continuously-variable-transmission (CVT) shafts are similarly deep groove ball bearings. The deep groove ball bearing includes an outer ring which serves as an outer bearing ring, an inner ring which serves an inner bearing ring, a plurality of balls, and a cage which is made of resin and holds the balls. The balls are rolling elements disposed between the outer ring and the inner ring and allowed to roll.

The rolling bearing used for the support shafts is disposed in lubricating oil in the transmissions or the CVTs. When the lubricating oil has a high oil level, agitation resistance of the oil is increased with the rotation of the rolling bearing, which causes torque loss. The oil level of the lubricating oil needs to be lowered to reduce the agitation resistance. In order to achieve this, the lubricating oil is required to smoothly flow through portions of the cage and the balls that are between the outer ring and the inner ring of the rolling bearing.

FIG. 8 shows a rolling bearing 100 disclosed in Japanese Patent Application Publication No. 2009-281585 (JP 2009-281585 A). In this rolling bearing 100, balls 106 are disposed between an outer ring 102 and an inner ring 104 and allowed to roll in deep grooves. In the rolling bearing 100, the balls 106 are held by a snap cage 108 which is made of resin. The snap cage 108 has an inner circumferential surface 108A in a radial direction. The inner circumferential surface 108A is a tilted surface and tilted such that the bore diameter of the cage 108 increases from the right side toward the left side as shown in FIG. 8. In the cage 108 having the tilted inner circumferential surface 108A and formed in such a tapered shape, lubricating oil flows well from the right side to the left side in FIG. 8 between the outer ring 102 and the inner ring 104, with the aid of centrifugal force. Accordingly, discharge efficiency of the lubricating oil is improved. This can lower the oil level of the lubricating oil, thereby reducing the agitation resistance of the lubricating oil.

In the case of the rolling bearing 100 shown in FIG. 8, the lubricating oil flows well from the right side to the left side. This configuration, however, is not effective in the case where the lubricating oil flows in the opposite direction, namely from the left side to the right side. That is, the configuration of the rolling bearing 100 is effective only when the lubrication oil flows in a certain direction.

In the conventional rolling bearing, in a case where efficiency with which lubricating oil flows in a rolling bearing is influenced by directions in which the lubricating oil flows, the rolling bearing needs to be installed in a device in consideration of the orientation of the rolling bearing. Such installation will be inconvenient. Accordingly, there is a demand for a rolling bearing which allows lubricating oil to flow well with similar efficiency in both directions so that the rolling bearing can be installed in a device without consideration of the orientation of the rolling bearing. There is also a demand for a rolling bearing in which lubricating oil flows well in both directions in a case where the lubricating oil flows in the rolling bearing in both directions.

SUMMARY OF THE INVENTION

It is an object of the present invention to provide a rolling bearing that allows the lubricating oil to flow well in two directions, between an outer ring and an inner ring of the rolling bearing.

According to an aspect of the present invention, a rolling bearing includes: an outer bearing ring, an inner bearing ring, a plurality of rolling elements disposed between the outer bearing ring and the inner bearing ring and allowed to roll; and a snap cage that is made of resin and holds the rolling elements. The snap cage includes an annular main portion and a plurality of cage bars. The cage bars each protrude in an axial direction from a side surface of the main portion on one side in the axial direction. Pockets are formed between the cage bars that are adjacent to each other to house respective rolling elements. An inner circumferential surface and an outer circumferential surface of each of the cage bars in a radial direction have respective tilted surfaces that form a tapered shape in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the present invention will be described with reference to the accompanying drawings. A rolling bearing 10 of the embodiment is a deep groove ball bearing used for transmission shafts or CVT shafts of HVs.

Figure 1:
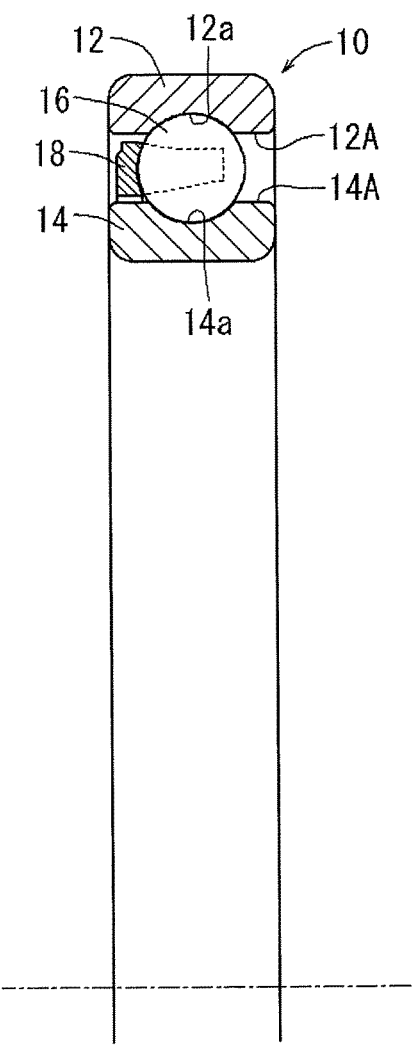
FIG. 1 is a sectional view of half of a rolling bearing according to an embodiment of the present invention.
Figure 2:
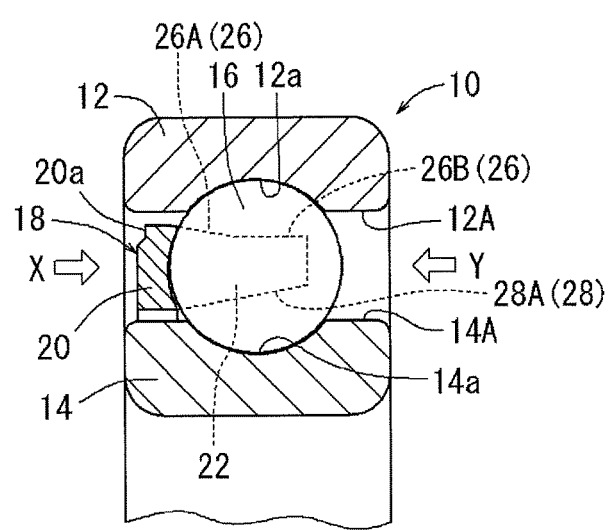
FIG. 2 is an enlarged sectional view of a main portion of FIG. 1.

As shown in FIGS. 1 and 2, the rolling bearing 10 includes an outer ring 12 which serves as an outer bearing ring, an inner ring 14 which serves an inner bearing ring, a plurality of balls 16, and a cage 18 which holds the balls 16. The balls 16 are rolling elements disposed between the outer ring 12 and the inner ring 14 and allowed to roll. The outer ring 12 and the inner ring 14 are disposed to face each other in a radial direction. The outer ring 12 has a concave outer ring raceway surface 12a on the inner circumferential surface of the outer ring 12. The inner ring 14 has a concave inner ring raceway surface 14a on the outer circumferential surface of the inner ring 14.

The balls 16 that serve as rolling elements are disposed between the outer ring raceway surface 12a and the inner ring raceway surface 14a and allowed to roll. The outer ring 12, the inner ring 14, and the balls 16 are made of metal such as bearing steel. The cage 18 is made of synthetic resin, and is guided by the rolling elements. Flow clearances are formed between the cage 18 and an outer ring inner circumferential surface 12A and between the cage 18 and an inner ring outer circumferential surface 14A. Lubricating oil can flow through the flow clearances.

Figure 3:
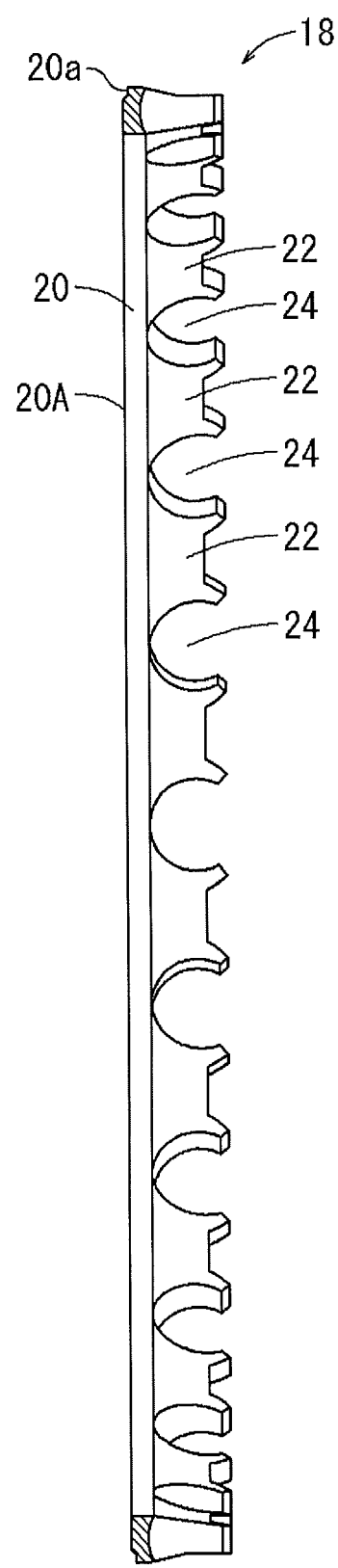
FIG. 3 is a sectional view of a cage in which the cage is cut in half.
Figure 4:
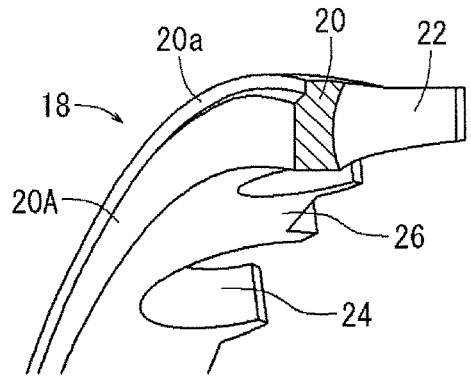
FIG. 4 is a partial perspective view of the cage.
Figure 5:
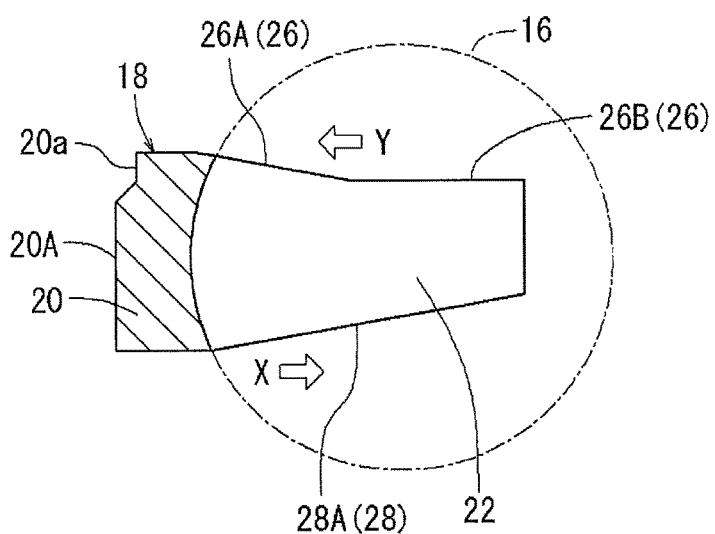
FIG. 5 is a diagram showing one embodiment of a tapered shape of a cage bar of the cage.

As shown in FIGS. 3 to 5, the cage 18 includes an annular main portion 20 and a plurality of cage bars 22. The cage bars 22 each protrude in an axial direction (the rightward direction) from one side of the main portion 20 in the axial direction (the right side in FIGS. 3 to 5). The cage bars 22 are disposed at intervals in a circumferential direction. Pockets (ball housing spaces) 24 are formed between cage bars 22 that are adjacent to each other to house the respective balls 16. The pockets 24 each cover more than half of the perimeter of the ball 16. Since the cage 18 is a snap cage made of resin, the balls 16 can be easily assembled into the pockets 24 of the cage 18.

As shown in FIG. 5, an outer circumferential surface 26 and an inner circumferential surface 28 of each cage bar 22 of the cage 18 in the radial direction have tilted surfaces 26A and 28A, respectively, which are tilted with respect to an axis of the cage 18. The tilted surface 26A of the outer circumferential surface 26 is tilted such that the outside diameter of the cage 18 gradually increases from the right side toward the left side as shown in FIG. 5. In contrast, the tilted surface 28A of the inner circumferential surface 28 is tilted such that the bore diameter of the cage 18 gradually increases from the left side toward the right side. Thus, the tilted surface 26A of the outer circumferential surface 26 and the tilted surface 28A of the inner circumferential surface 28 form a tapered shape.

In the cage 18 of FIG. 5, an angle at which the tilted surface 26A of the outer circumferential surface 26 is tilted with respect to the axis of the cage 18 is equal to that at which the tilted surface 28A of the inner circumferential surface 28 with respect to the axis, and may be 10 degrees. Making these angles identical allows easy molding of the resin cage 18. The tilted surface 26A of the outer circumferential surface 26 of the cage bar 22 is continuous with a straight surface 26B at an end portion of the tilted surface 26A. The straight surface 26B is formed parallel to the axis of the cage 18. The straight surface 26B provided at an end portion of the outer circumferential surface 26 of the cage bar 22 allows making the end portion of the cage bar 22 thick. Accordingly, it is possible to ensure strength required for the cage bars 22 to hold the balls 16. A length of the straight surface 26B of the end portion of each cage bar 22 is determined in design of the rolling bearing, in consideration of the strength required for the cage bars 22 to hold the balls 16.

Among surfaces of the main portion 20 of the cage 18, a surface 20A (the surface on the left side in FIGS. 2 and 3) is on the opposite side of the main portion 20 from the one side and has no cage bars 22. In a conventional rolling bearing, the surface 20A has recesses in portions corresponding to the positions of the cage bars 22 in the circumferential direction for the purpose of weight reduction. In this embodiment, the surface 20A does not have any recesses and is flat. This can reduce the agitation resistance of the lubricating oil, thereby improving the discharge efficiency of the lubricating oil. An annular cutout 20a is formed in the surface 20A on the opposite side (the surface on the left side in FIGS. 2 and 3) in a radially outer edge thereof so as to prevent interference with the surface 20A and components adjacent to the surface 20A. In a case where any interference cannot be caused, the cutout 20a may not be provided, and the entire surface of the surface 20A on the opposite side is preferably made flat.

According to the configuration of the rolling bearing 10 of the above embodiment, the tilted surface 26A of the outer circumferential surface 26 of the cage 18 and the tilted surface 28A of the inner circumferential surface 28 of the cage 18 form a tapered shape. Therefore, lubricating oil can flow well in the rolling bearing 10 in both directions. That is, in the case where the lubricating oil flows from the left side to the right side in FIG. 2 (in the X direction in FIG. 2), since the tilted surface 28A of the inner circumferential surface 28 of the cage bar 22 of the cage 18 is tilted such that, the bore diameter of the cage 18 increases from the left side toward the right side as seen in FIG. 2, the lubricating oil flows smoothly in the rightward direction with the aid of the centrifugal force produced by the rotation of the rolling bearing 10. In contrast, in the case where the lubricating oil flows from the right side to the left side in FIG. 2 (in the Y direction in FIG. 2), since the tilted surface 26A of the outer circumferential surface 26 of the cage bar 22 of the cage 18 is tilted such that the outside diameter of the cage 18 increases from the right side toward the left side, the lubricating oil flows smoothly in the leftward direction with the aid of the centrifugal force produced by the rotation of the rolling bearing 10. In this manner, the rolling bearing 10 of the present embodiment allows the lubricating oil to flow well in both the rightward and leftward directions, thereby improving discharge efficiency of the lubricating oil.

Figure 6:
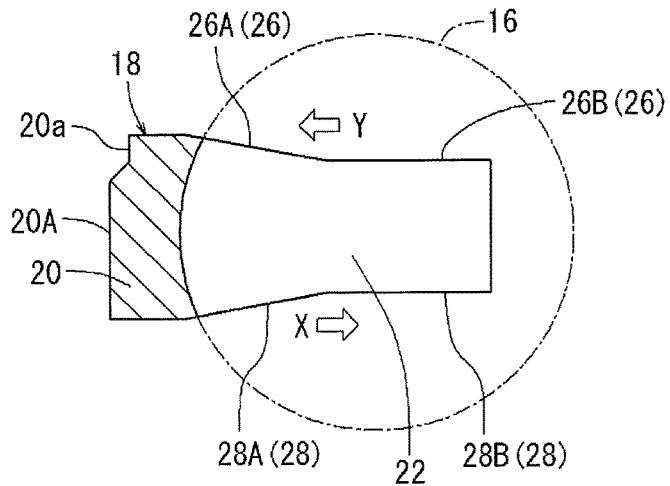
FIG. 6 is a first modification of the cage shown in FIG. 5.

FIG. 6 shows a first modification of the cage 18. In this modification, the straight surface 26B and another straight surface 28B are formed in the end portion of the cage 18 on both of the outer circumferential surface 26 and the inner circumferential surface 28 of the cage bar 22, respectively, in view of strength. Therefore, the outer circumferential surface 26 and the inner circumferential surface 28 can be made symmetrical with respect to a center line of the cage bar 22, and thus the cage 18 can be more easily molded.

Figure 7:
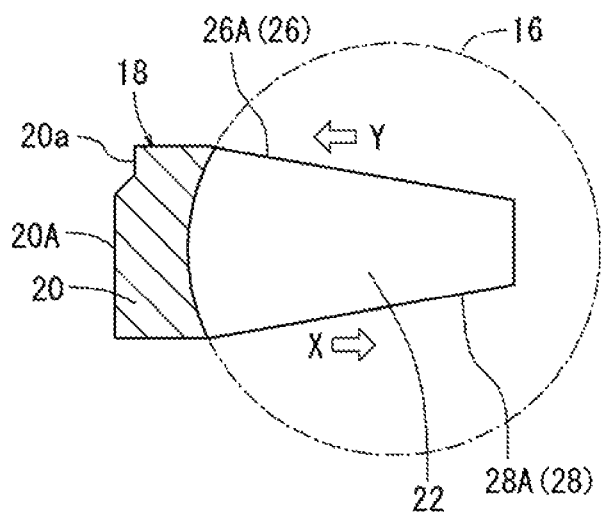
FIG. 7 is a second modification of the cage shown in FIG. 5.
Figure 8:
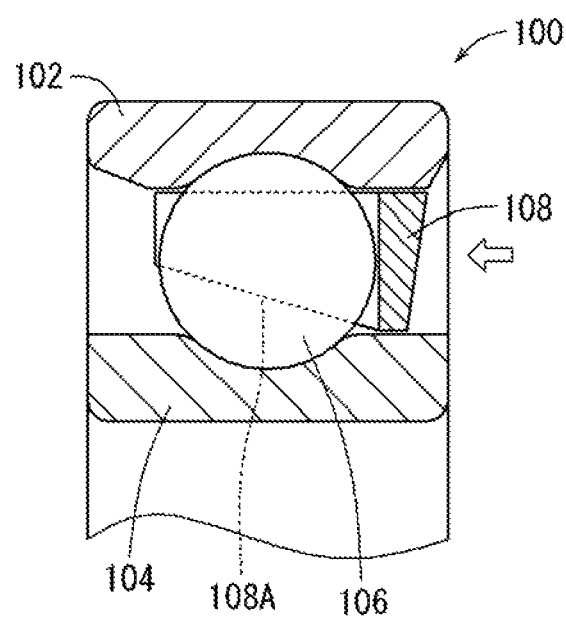
FIG. 8 is a sectional view of a conventional rolling bearing.

FIG. 7 shows a second modification of the cage 18. In this modification, no straight surface is formed on the end portion of the cage bar 22, and the outer circumferential surface 26 and the inner circumferential surface 28 have only the tilted surfaces 26A and 28A, respectively. As long as the strength of the end portion is ensured, it is possible to form the cage bar 22 such that the outer circumferential surface 26 and the inner circumferential surface have only the tilted surfaces 26A and 28A as shown in FIG. 7. This shape of the cage bar 22 allows easier molding of the cage 18.

In the modification shown in FIG. 7, since a centrifugal force produced at the tilted surface 26A of the outer circumferential surface 26 of the cage bar 22 is different from that produced at the tilted surface 28A of the inner circumferential surface 28, the angle at which the tilted surface 26A is tilted from the axis of the cage 18 is different from that at which the tilted surface 28A is tilted from the axis. Specifically, since the tilted surface 26A of the outer circumferential surface 26 is formed on a radially outward of the tilted surface 28A of the inner circumferential surface 28, the centrifugal force acting on the tilted surface 26A is greater than that acting on the tilted surface 28A. Thus, the angle at which the tilted surface 26A of the outer circumferential surface 26 is tilted is smaller than that at which the tilted surface 28A of the inner circumferential surface 28 is tilted due to the difference between the centrifugal forces. Therefore, efficiency with which the lubricating oil flows in the rightward direction (in the X direction in FIG. 2) is similar to that with which the lubricating oil in the leftward direction (in the Y direction in FIG. 2). Efficiency with which the lubricating oil flows on the outer circumferential surface 26 and the inner circumferential surface 28 also depends on the presence/absence and the length of the straight surfaces 26B, 28B. Accordingly, it is preferable that efficiency with which the lubrication oil flows be adjusted by appropriate combinations of parameters of presence/absence of the straight surfaces 26B, 28B, the length of the straight surfaces, and the angles of the tilted surfaces 26A, 28A so that the lubrication oil flows on the outer circumferential surface 26 and the inner circumferential surface 28 with the same efficiency.

A specific embodiment of the present invention has been described above, but the present invention may also be implemented in other various forms.

Although the above embodiment describes the case where the deep groove ball bearing is used as a rolling bearing, the present invention can be applied to other various rolling bearings.

The cage 18 in the above embodiment is guided by the rolling elements. However, the cage 18 may be guided by the outer ring or the inner ring as long as the flow clearances are ensured in the inner circumference and the outer circumference of the cage 18.

In the above embodiment, the side surface which is on the opposite side of the cage 18 from the cage bars 22 is formed as the flat surface 20A having no recesses. The surface 20A, however, is not necessarily made flat, and may have recesses for weight reduction. In a case where the agitation resistance needs to be reduced, it is preferable that the surface 20A have no recesses.

According to the above-described embodiment of the present invention, the lubricating oil flows well, in both directions, between the outer ring and the inner ring of the rolling bearing.

What is claimed is:

1. A rolling bearing comprising:
an outer bearing ring;
an inner bearing ring;
a plurality of rolling elements disposed between the outer bearing ring and the inner bearing ring and allowed to roll; and
a snap cage that is molded with synthetic resin and holds the rolling elements, wherein
the snap cage includes an annular main portion and a plurality of cage bars;
the cage bars each protrude in an axial direction from a side surface of the main portion on one side in the axial direction;
pockets are formed between the cage bars that are adjacent to each other to house the respective rolling elements;
both an inner circumferential surface and an outer circumferential surface of each of the cage bars in a radial direction have tilted surfaces that are inclined surfaces and that form a tapered shape in the axial direction;
in a protruding end portion of each of the cage bars of the snap cage, at least one of the inner circumferential surface and the outer circumferential surface has a straight surface that is parallel to the axial direction, and
a surface of the annular main portion of the cage, which is on an opposite side of the annular main portion from the one side where the cage bars are formed, is a flat surface having no recess.

2. The rolling bearing according to claim 1, wherein the tilted surfaces of the inner circumferential surface and the outer circumferential surface of each of the cage bars are tilted toward a center line of the cage bar by the same angle to form the tapered shape.

3. The rolling bearing according to claim 1, wherein the tilted surfaces of the inner circumferential surface and the outer circumferential surface of each of the cage bars are tilted toward a center line of the cage bar at different angles to form a tapered shape.

* * * * *